(12) United States Patent
Weng

(10) Patent No.: US 11,450,028 B2
(45) Date of Patent: Sep. 20, 2022

(54) CAR LENS OFFSET DETECTION METHOD AND CAR LENS OFFSET DETECTION SYSTEM BASED ON IMAGE PROCESSING OF MULTIPLE CAMERAS

(71) Applicant: Wistron Corporation, New Taipei (TW)

(72) Inventor: Cheng-Sheng Weng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/429,085

(22) Filed: Jun. 3, 2019

(65) Prior Publication Data

US 2020/0294268 A1    Sep. 17, 2020

(30) Foreign Application Priority Data

Mar. 12, 2019   (TW) ................................. 108108233

(51) Int. Cl.
*G06T 7/00* (2017.01)
*G06T 7/80* (2017.01)
(Continued)

(52) U.S. Cl.
CPC ................ *G06T 7/80* (2017.01); *B60R 1/081* (2013.01); *B60R 1/12* (2013.01); *B60R 11/0235* (2013.01);
(Continued)

(58) Field of Classification Search
CPC ..... G06T 7/80; G06T 7/11; G06T 7/73; G06T 7/174; G06T 5/50; G06T 2207/20221;
(Continued)

(56) References Cited

U.S. PATENT DOCUMENTS

2015/0213589 A1    7/2015   Chou et al.
2016/0307048 A1*  10/2016   Krishnamoorthy ....... G06T 7/70
(Continued)

FOREIGN PATENT DOCUMENTS

| CN | 105144707 | 12/2015 |
| WO | 2016035252 | 3/2016 |
| WO | 20180086631 | 1/2018 |

OTHER PUBLICATIONS

"Office Action of China Counterpart Application", dated Oct. 9, 2021, p. 1-p. 12.
(Continued)

*Primary Examiner* — Pakee Fang
(74) *Attorney, Agent, or Firm* — JCIPRNET

(57) ABSTRACT

A car lens offset detection method and a car lens offset detection system are provided. The first image capturing device and the second image capturing device are disposed on a car, and the method includes: capturing a first image with use of a first image capturing device and capturing a second image with use of a second image capturing device; obtaining a plurality of first feature points from the first image according to a plurality of first predetermined positions and obtaining a plurality of second feature points from the second image according to a plurality of second predetermined positions; comparing feature values of the first feature points with feature values of the second feature points and determining whether the first feature points match the second feature points; in response to the first feature points not matching the second feature points, performing a calibration and warning operation.

14 Claims, 8 Drawing Sheets

(51) Int. Cl.
*B60R 1/12* (2006.01)
*B60R 11/02* (2006.01)
*B60R 11/04* (2006.01)
*G06T 5/50* (2006.01)
*G06T 7/11* (2017.01)
*G06T 7/174* (2017.01)
*G06T 7/73* (2017.01)
*B60R 1/08* (2006.01)
*G06V 20/58* (2022.01)

(52) U.S. Cl.
CPC ................ *B60R 11/04* (2013.01); *G06T 5/50* (2013.01); *G06T 7/11* (2017.01); *G06T 7/174* (2017.01); *G06T 7/73* (2017.01); *G06V 20/58* (2022.01); *B60R 2001/1215* (2013.01); *B60R 2300/105* (2013.01); *B60R 2300/303* (2013.01); *B60R 2300/304* (2013.01); *B60R 2300/402* (2013.01); *B60R 2300/8026* (2013.01); *B60R 2300/8066* (2013.01); *G06T 2207/20221* (2013.01); *G06T 2207/30261* (2013.01)

(58) Field of Classification Search
CPC . G06T 2207/30261; B60R 1/081; B60R 1/12; B60R 11/0235; B60R 11/04; B60R 2001/1215; B60R 2300/105; B60R 2300/303; B60R 2300/304; B60R 2300/402; B60R 2300/8026; B60R 2300/8066; G06K 9/00805
See application file for complete search history.

(56) References Cited

U.S. PATENT DOCUMENTS

| | | | |
|---|---|---|---|
| 2018/0174327 A1* | 6/2018 | Singh | B60R 1/00 |
| 2019/0217783 A1* | 7/2019 | Hasegawa | B60R 1/088 |
| 2020/0086791 A1* | 3/2020 | Hardy | G06T 3/4038 |

OTHER PUBLICATIONS

"Office Action of China Counterpart Application", dated Mar. 17, 2022, p. 1-p. 12.

* cited by examiner

CAR LENS OFFSET DETECTION METHOD AND CAR LENS OFFSET DETECTION SYSTEM BASED ON IMAGE PROCESSING OF MULTIPLE CAMERAS

CROSS-REFERENCE TO RELATED APPLICATION

This application claims the priority benefit of Taiwan application serial no. 108108233, filed on Mar. 12, 2019. The entirety of the above-mentioned patent application is hereby incorporated by reference herein and made a part of this specification.

TECHNICAL FIELD

The disclosure relates to a car lens offset detection method and a car lens offset detection system; more particularly, the disclosure relates to a car lens offset detection method and a car lens offset detection system based on image processing technologies.

DESCRIPTION OF RELATED ART

The interior rear view mirror is an important tool for a driver to observe the rear traffic conditions while driving a car. Since the rear-view image is reflected into the driver's eyes according to the operating principle of the reflective mirror, when another car behind the car turn on the headlights, the issue of unclear sight or glare may occur. Besides, the driver may be unable to clearly observe the rear traffic conditions through the rear view mirror due to obstruction of objects inside the car, weather conditions, or environmental factors. Therefore, the concept of replacing the conventional rear view mirror with an electric rear view mirror has been proposed recently. A display module is disposed in the existing electric rear view mirror, so that the rear view mirror can display images that are captured by an image capturing device and indicate road conditions through the display module.

Compared to the conventional rear view mirror having no display module, the electric rear view mirror features a wider field of view. The reason lies in that the display image of the electric rear view mirror can be generated by stitching a plurality of images captured by a plurality of lenses disposed at different positions, so that the blind spots of the conventional rear view mirror no longer exist. However, when the lenses configured to capture the images are displaced or rotated, the stitched images may be distorted or deformed, and the driver may be in danger because the electric rear view mirror displays the distorted or deformed image content.

SUMMARY

The disclosure provides a car lens offset detection method and an offset detection system configured to detect whether a car lens is offset, so as to ensure driving safety.

In an embodiment of the disclosure, a car lens offset detection method is provided, wherein a first image capturing device and a second image capturing device are disposed on a car, and the method includes: capturing a first image with use of a first image capturing device and capturing a second image with use of a second image capturing device; obtaining a plurality of first feature points from the first image according to a plurality of first predetermined positions and obtaining a plurality of second feature points from the second image according to a plurality of second predetermined positions; comparing feature values of the first feature points with feature values of the second feature points and determining whether the first feature points match the second feature points; in response to the first feature points not matching the second feature points, performing a calibration and warning operation.

In an embodiment of the disclosure, a car lens offset detection system disposed on a car is provided, and the system includes a first image capturing device, a second image capturing device, a storage circuit, and a processor. The storage circuit stores a plurality of modules. The processor is coupled to the storage circuit, the first image capturing device, and the second image capturing device and accesses the modules to perform following steps: capturing a first image with use of a first image capturing device and capturing a second image with use of a second image capturing device; obtaining a plurality of first feature points from the first image according to a plurality of first predetermined positions and obtaining a plurality of second feature points from the second image according to a plurality of second predetermined positions; comparing feature values of the first feature points with feature values of the second feature points and determining whether the first feature points match the second feature points; in response to the first feature points not matching the second feature points, performing a calibration and warning operation.

In view of the above, in one or more embodiments provided in the disclosure, whether the car lens disposed in the car is offset can be instantly detected in no need of doing a significant amount of calculations, so as to improve driving safety. Besides, according to the offset detection method and system provided in one or more embodiments of the disclosure, if the car lens is offset, the corresponding calibration and warning operation can be performed, so as to prevent the electric rear view mirror from displaying distorted or deformed images.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Some embodiments are provided in detail below with reference to the accompanying drawings. When the same reference numbers appear in different figures, they will be regarded as indicating the same or similar components. These embodiments are only part and are not all embodiments of the disclosure. More particularly, these embodiments are examples of the car lens offset detection method and system provided in the claims of this disclosure.

Figure 1:
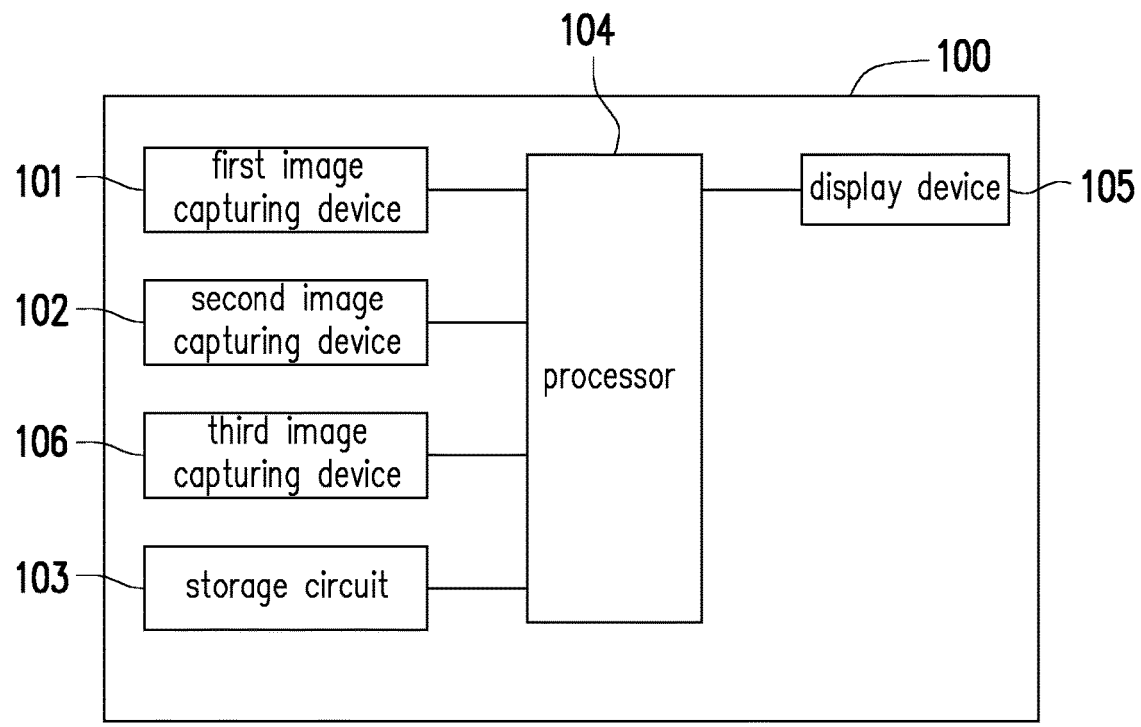
FIG. 1 is a schematic view illustrating a car lens offset detection system according to an embodiment of the disclosure.

FIG. 1 is a schematic view illustrating a car lens offset detection system according to an embodiment of the disclosure. With reference to FIG. 1, a car lens offset detection system 100 is adapted to be disposed on a car and includes a first image capturing device 101, a second image capturing device 102, a third image capturing device 106, a storage circuit 103, a processor 104, and a display device 105.

The first image capturing device 101, the second image capturing device 102, and the third image capturing device 106 are disposed in a car and are, for instance, image sensors having a car lens, a charge coupled device, or a complementary metal-oxide semiconductor (CMOS) device and are configured to capture images around the car. Note that the field of view by which the first image capturing device 101 takes images and the field of view by which the second image capturing device 102 takes images are partially overlapped, and therefore repetitive contents of scene can be captured or stitched. In another embodiment, the field of view by which the first image capturing device 101 takes images and the field of view by which the third image capturing device 106 takes images are partially overlapped, and therefore repetitive contents of scene can be captured or stitched. Besides, the number of image capturing devices on the car can be changed according to actual requirements, which should not be construed as a limitation in the disclosure.

Figure 2:
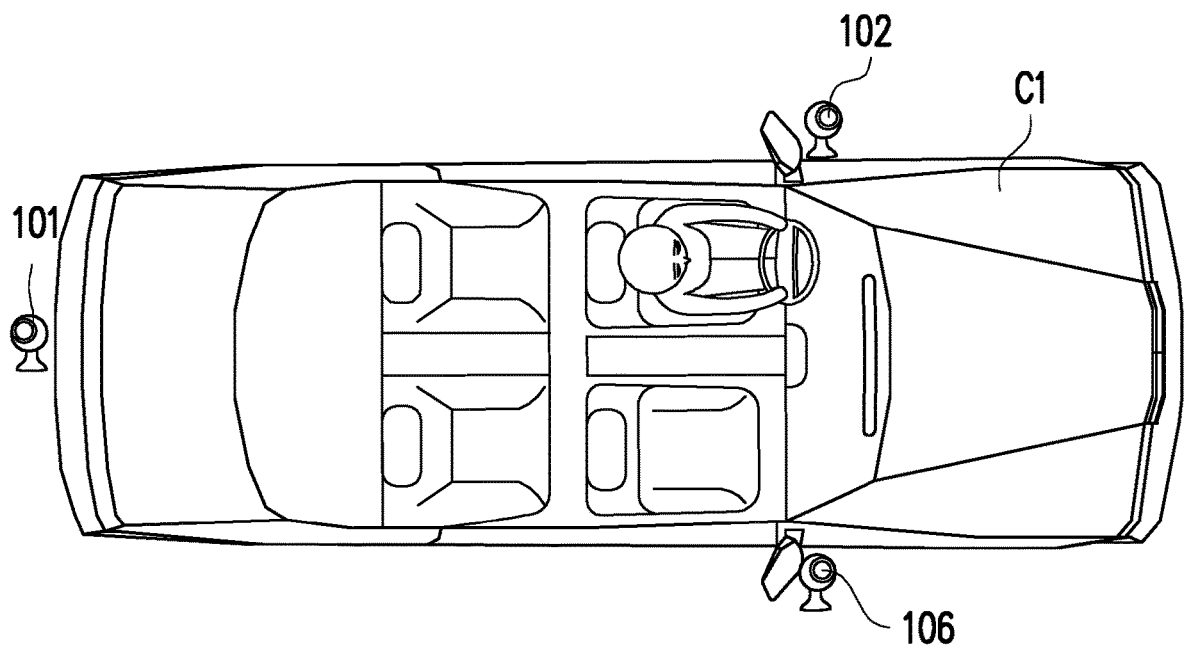
FIG. 2 is a schematic view of an exemplary application scenario according to an embodiment of the disclosure.

FIG. 2 is a schematic view of an exemplary application scenario according to an embodiment of the disclosure. With reference to FIG. 2, the first image capturing device 101 can be disposed at the rear side of a car C1, so as to capture a rear view image behind the car. The second image capturing device 102 can be disposed on a left-side rear view mirror of the car C1, so as to capture a left-side image at the left side of the car. The rear view image captured by the first image capturing device 101 and the left-side image captured by the second image capturing device 102 are at least partially overlapped. Similarly, the third image capturing device 106 can be disposed on a right-side rear view mirror of the car C1, so as to capture a right-side image at the right side of the car. The rear view image captured by the first image capturing device 101 and the right-side image captured by the third image capturing device 106 are at least partially overlapped. To make clear explanations in the disclosure, the following embodiments will be provided with reference to the arrangement depicted in FIG. 2, for instance, which should however not be construed as a limitation in the disclosure.

The storage circuit 103 is, for instance, any type of fixed or mobile random access memory (RAM), read-only memory (ROM), flash memory, hard drive, any other similar device, or a combination thereof and can be configured to record a plurality of programming codes or modules.

The processor 104 is coupled to the storage circuit 103, the first image capturing device 101, the second image capturing device 102, the third image capturing device 106, and the display device 105 and can be a general-purpose processor, a special-purpose processor, a conventional processor, a digital signal processor (DSP), a plurality of microprocessors, one or more microprocessors combined with DSP core, a controller, a micro-controller, an application specific integrated circuit (ASIC), a field programmable gate array (FPGA), any other type of integrated circuit, state machine, a processor based on advanced RISC machine (ARM), and the like. In an embodiment of the disclosure, the processor 104 can load programming codes or modules recorded in the storage circuit 103 to apply the car lens offset detection method proposed in the disclosure, which will further be explained with reference to a flowchart.

The display device 105 is, for instance, a liquid crystal display (LCD), a light-emitting diode (LED) display, or any other type of display configured to display images to a driver of the car, which should not be construed as a limitation in the disclosure.

In an embodiment, note that the display device 105 and a mirror may be integrated as an electric rear view mirror. When a backlight module of the display device 105 is turned on, the electric rear view mirror can display images of road conditions according to the image content captured by the first image capturing device 101, the second image capturing device 102, and the third image capturing device 106. When the backlight module of the display device 105 is turned off, the electric rear view mirror can act as a conventional rear view mirror.

Figure 3:
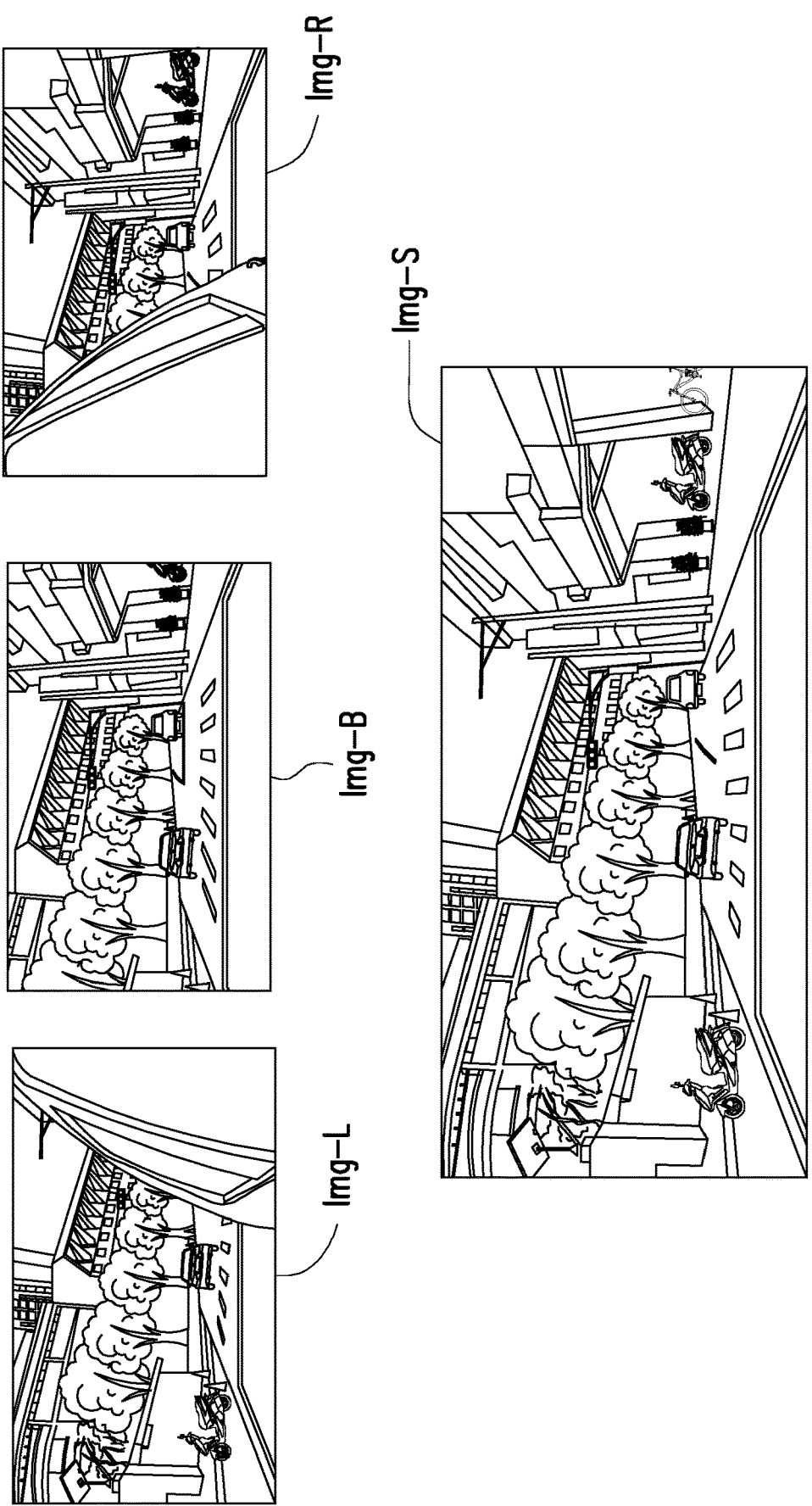
FIG. 3 is a schematic view of an exemplary application scenario according to an embodiment of the disclosure.

In an embodiment, the processor 104 can perform an image stitching function on the images captured by the first image capturing device 101, the second image capturing device 102, and the third image capturing device 106, so as to generate a stitched image with larger visual range, and the electric rear view mirror is controlled to display the stitched image, so as to eliminate blind spots of the conventional rear view mirror. FIG. 3 is a schematic view of an exemplary application scenario according to an embodiment of the disclosure. With reference to FIG. 3, the first image capturing device 101 can capture a rear view image Img-B at the rear side of the car, the second image capturing device 102 can capture a left-side image Img-L at the left side of the car, and the third image capturing device 106 can capture a right-side image Img-R at the right-side of the car. The processor 104 can perform the image stitching function on the rear view image Img-B, the left-side image Img-L, and the right-side image Img-R to generate a stitched image Img-S. Note that the electric rear view mirror is required to reflect the road conditions instantly, and therefore stitching parameters (e.g., a matrix of image mapping and transformation, etc.) required for performing the image stitching function are generated and stored according to the predetermined lens position. Thereby, the processor 104 can perform the image stitching function according to the pre-stored stitching parameters in no need of performing a significant amount of calculations and spending a considerable amount of calculation time. However, if the lens positions of the first image capturing device 101, the second image capturing device 102, and the third image capturing device 106 are offset, the stitched image resulting from performing the image stitching function is going to be distorted or deformed. Accordingly, in the car lens offset detection method and system provided in the disclosure, whether the car lens is offset can be instantly detected, and a calibration and warning operation can be correspondingly performed, so as to prevent a driver from being misled by distorted images through the electric rear view mirror.

Figure 4:
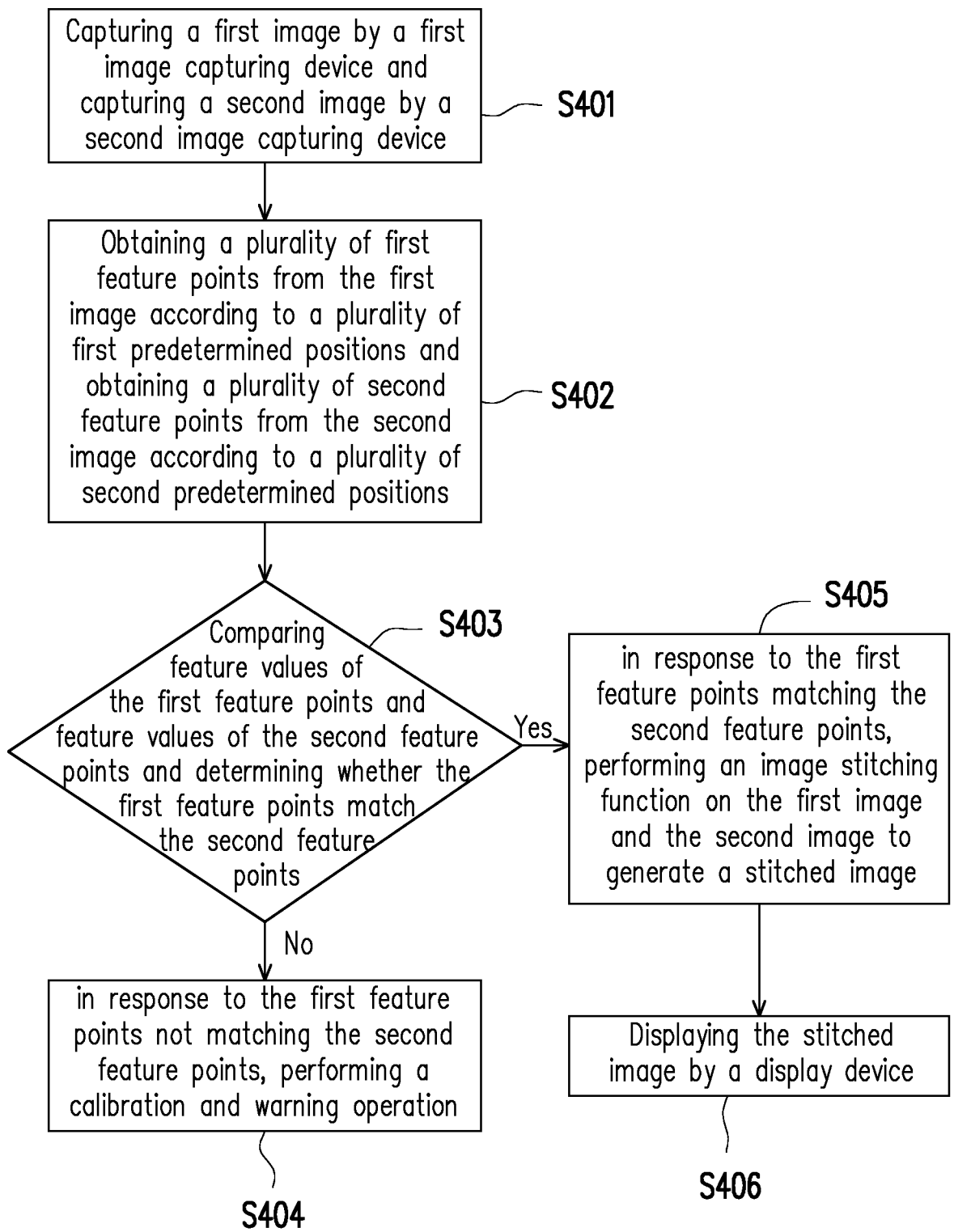
FIG. 4 is a flowchart of a car lens offset detection method according to an embodiment of the disclosure.

FIG. 4 is a flowchart of a car lens offset detection method according to an embodiment of the disclosure. With reference to FIG. 4, the car lens offset detection method provided in the present embodiment is applicable to the car lens offset detection system 100 provided in the previous embodiment, and detailed steps of the method provided in the present embodiment are elaborated with reference to the components of the car lens offset detection system 100.

In step S401, the processor 104 captures a first image (i.e., the rear view image) by the first image capturing device 101 and captures a second image (i.e., the left-side image) by the second image capturing device 102. In step S402, the processor 104 obtains a plurality of first feature points from the first image according to a plurality of first predetermined positions and obtains a plurality of second feature points from the second image according to a plurality of second predetermined positions. Specifically, the first predetermined positions and the second predetermined positions refer to information of a plurality of pre-stored pixel coordinates. Besides, the first feature points and the second feature points are blocks of pixel sets constituted by a plurality of adjacent pixels. For instance, the first feature points and the second feature points can respectively be blocks of pixel sets with a radius of 9 pixels. However, the number, the size, and the shape of the first feature points and those of the second feature points can be determined according to actual requirements, which should however not be construed as limitations in the disclosure. That is, the processor 104 can capture a plurality of blocks of pixel sets from the first image and the second image according to the information of the pre-stored pixel coordinates. In another embodiment, the first predetermined positions of the first feature points in the first image and the second predetermined positions of the second feature points in the second image fall within a overlapping region where the field of view of the first image capturing device 101 and field of view of the second image capturing device 102 are overlapped. The feature points can be selected in advance from the overlapping region of two images, so as to define the first predetermined positions in the first image and the second predetermined positions in the second image according to the selected feature points.

Next, in step S403, the processor 104 compares feature values of the first feature points and feature values of the second feature points and determines whether the first feature points match the second feature points. Particularly, the processor 104 can perform a feature extraction operation and a feature matching operation in the image processing technology and determine whether the feature values of the first feature points are the same as those of the corresponding second feature points. If the feature values of the first feature points are the same as those of the corresponding second feature points, the processor 104 determines the first feature points match the second feature points. If none of the feature values of the first feature points is the same as those of the corresponding second feature points, the processor 104 determines the first feature points do not match the second feature points.

If the determination result is yes in step S403, in step S405, in response to the first feature points matching the second feature points, the processor 104 performs an image stitching function on the first image and the second image to generate a stitched image. In step S406, the stitched image is displayed by the display device 105.

If the determination result is no in step S403, in step S404, in response to the first feature points not matching the second feature points, the processor 104 performs a calibration and warning operation. In an embodiment, the calibration and warning operation may include an activation of alert through one or a combination of indicative texts, sound, and light, so as to inform the driver of the offset of the car lens. For instance, when the processor 104 determines the first feature points do not match the second feature points, the processor 104 may turn on an LED light to inform the driver. Besides, according to an embodiment, the calibration and warning operation can include calibration of the offset of the car lens, so as to eliminate the negative impact resulting from the offset of the car lens. In another aspect, according to an embodiment, when the display device 105 and a mirror are integrated as an electric rear view mirror, the calibration and warning operation may include a step of turning off the backlight module of the display device 105, so that the electric rear view mirror can serve as a conventional rear view mirror and can be prevented from displaying any distorted or deformed stitched image.

It can be learned that the above embodiment is provided by taking the left-side image captured by the left-side lens and the rear view image captured by the rear-side lens as an example; however, the processor 104 is also able to perform the same steps by taking the right-side image captured by the right-side lens and the rear view image captured by the rear-side lens as an example. After the processor 104 determines that neither the left-side lens nor the right-side lens is offset, the image stitching operation is performed on the right-side image, the left-side image, and the rear view image to obtain the stitched image, so as to ensure that the electric rear view mirror displays the non-distorted or non-deformed stitched image.

Note that the determination in step S403 may be inaccurate due to environmental factors. Therefore, in an embodiment provided in the disclosure, the fault tolerance mechanism based on the non-matching number of times can prevent the car lens offset detection system 100 from issuing unnecessary alerts. This will be discussed with reference to the following embodiment.

Figure 5:
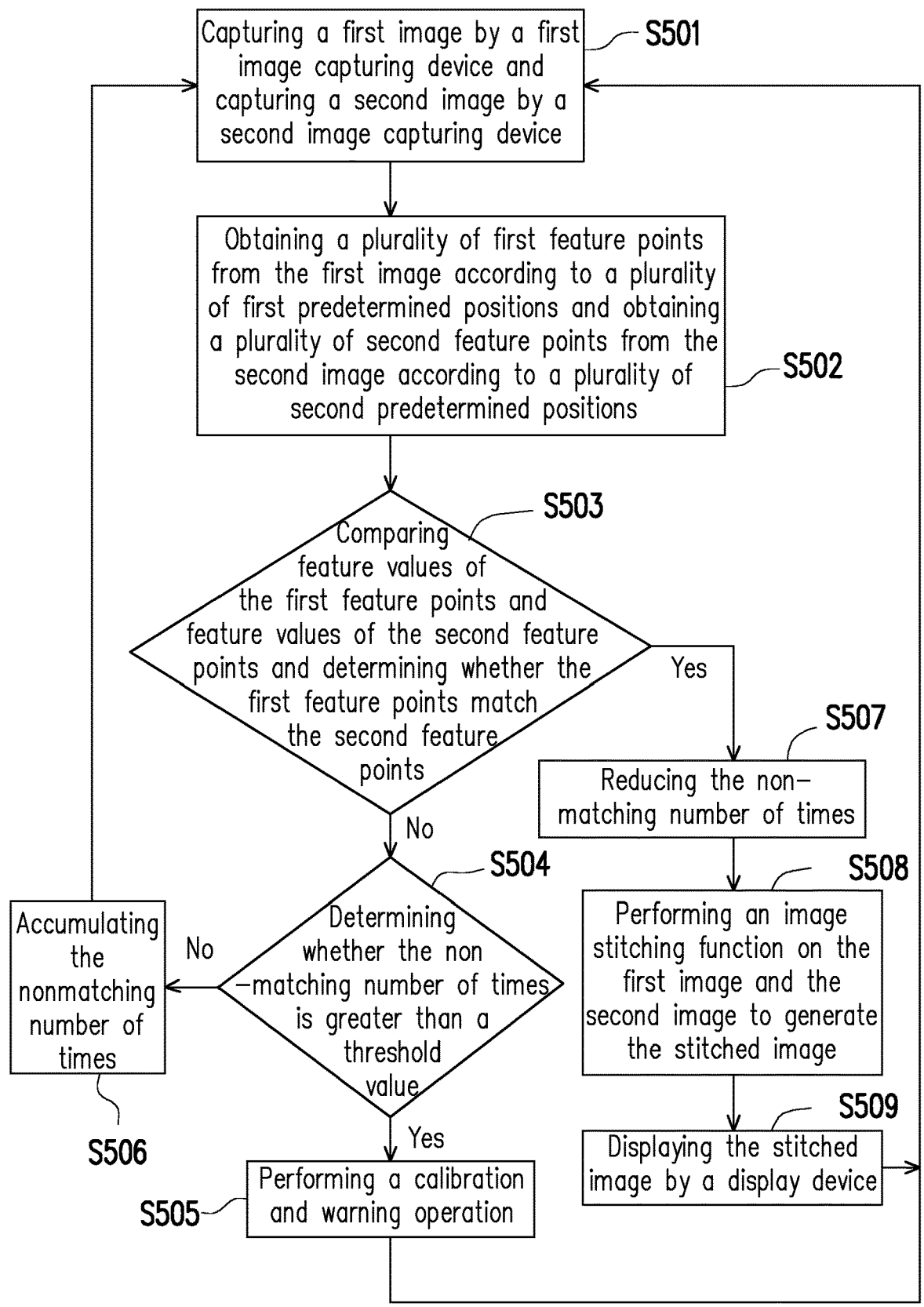
FIG. 5 is a flowchart of a car lens offset detection method according to an embodiment of the disclosure.

FIG. 5 is a flowchart of a car lens offset detection method according to an embodiment of the disclosure. With reference to FIG. 5, the car lens offset detection method provided in the present embodiment is applicable to the car lens offset detection system 100 provided in the previous embodiment, and detailed steps of the method provided in the present embodiment are elaborated with reference to the components of the car lens offset detection system 100.

Figure 6:
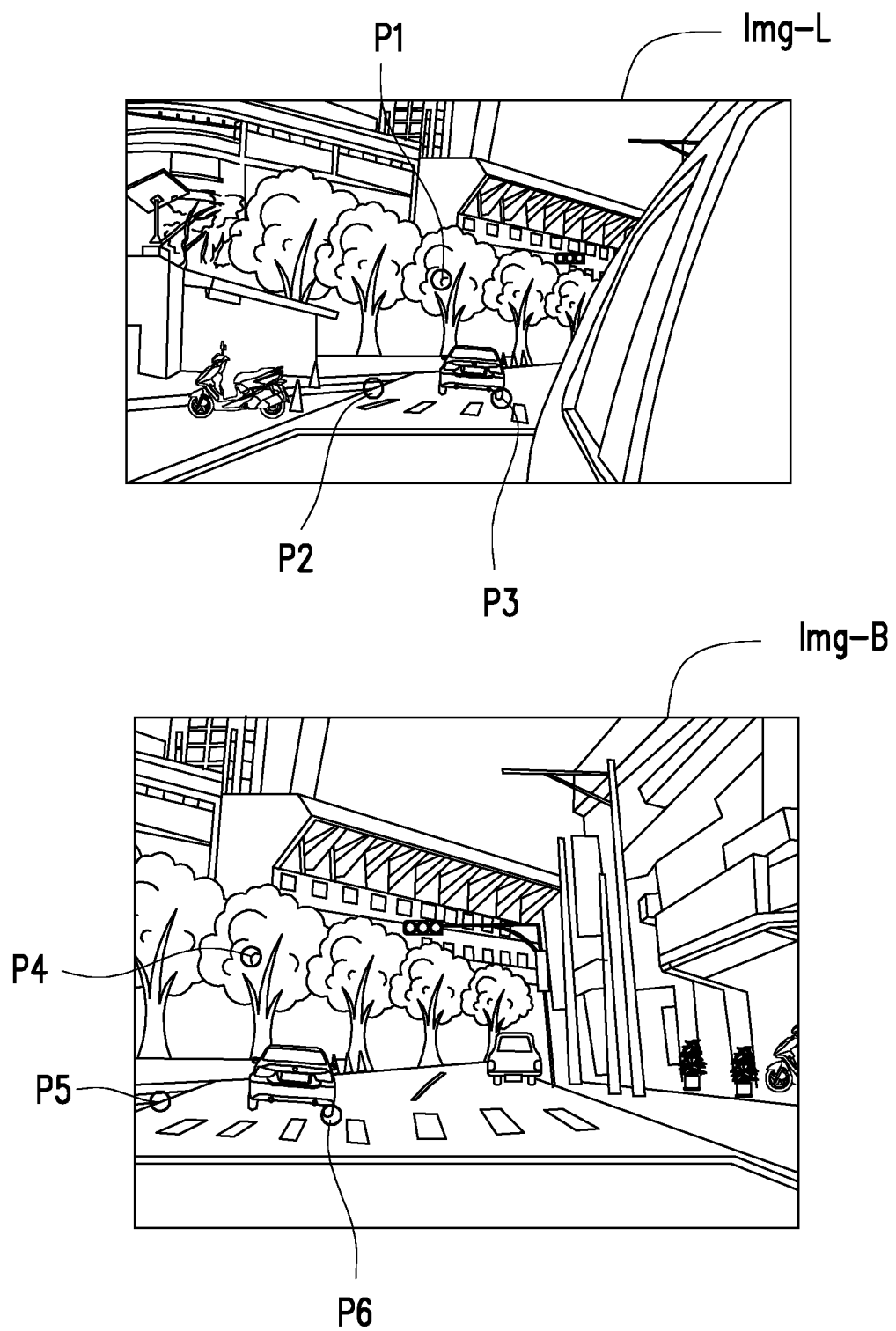
FIG. 6 is a schematic view illustrating a first image and a second image according to an embodiment of the disclosure.

In step S501, the processor 104 captures the first image by the first image capturing device 101 and captures the second image by the second image capturing device 102. In step S502, the processor 104 obtains a plurality of first feature points from the first image according to a plurality of first predetermined positions and obtains a plurality of second feature points from the second image according to a plurality of second predetermined positions. In step S503, the processor 104 compares feature values of the first feature points and feature values of the second feature points and determines whether the first feature points match the second feature points. The implementation details of said step S501-step S503 can be learned with reference to step S401-step S403. FIG. 6 illustrates an original image and an output image according to one embodiment of the present invention. With reference to FIG. 6, according to the information of the pre-stored pixel coordinates, the processor 104 can obtain three first feature points P4-P6 from the first image Img-B and obtain three second feature points P1-P3 from the second image Img-L. The processor 104 then performs a feature extraction operation and a feature matching operation on the first feature points P4-P6 and the second feature points P1-P3. In this exemplary embodiment, since the feature value of the first feature point P4 is the same as that of the corresponding second feature point P1, the feature value of the first feature point P5 is the same as that of the corresponding second feature point P2, and the feature value of the first feature point P6 is the same as that of the corresponding second feature point P3, the processor 104 may determine that the first feature points P4-P6 match the second feature points P1-P3.

Please refer to FIG. 5 again. If the first feature points do not match the second feature points, in step S504, the processor 104 determines whether the non-matching number of times is greater than the threshold value. If the non-matching number of times is less than or equal to the threshold value, in step S506, the processor 104 accumulates the non-matching number of times. If the non-matching number of times is greater than the threshold value, in step S505, the processor 104 performs the calibration and warning operation. In particular, during the movement of the car, the processor 104 can, for instance, periodically (e.g., every other second) determines whether the first feature points match the second feature points. However, the processor 104 may be misled due to environmental factors (e.g., insufficient environmental features, highly repetitive environmental features, and so forth). Therefore, according to the present embodiment, after the non-matching number of times is accumulated to be greater than the threshold value, the processor 104 performs the calibration and warning operation, so as to prevent the driver from being disturbed by unnecessary alerts. The threshold value can be set according to actual requirements, which should however not be construed as a limitation in the disclosure.

If the first feature points match the second feature points, in step S507, the processor 104 reduces the non-matching number of times. Specifically, if the car lens is not yet offset, the processor 104 may be misled only for several number of times in response to the environmental changes during the movement of the car. Hence, after determining that the first feature points match the second feature points, the processor 104 reduces the non-matching number of times accumulated because of the previous misleading activities. A method of reducing the non-matching number of times may include subtracting the non-matching number of times by a predetermined value. Next, in step S508, the processor 104 performs an image stitching function on the first image and the second image to generate the stitched image. In step S509, the display device 105 displays the stitched image.

Figure 7:
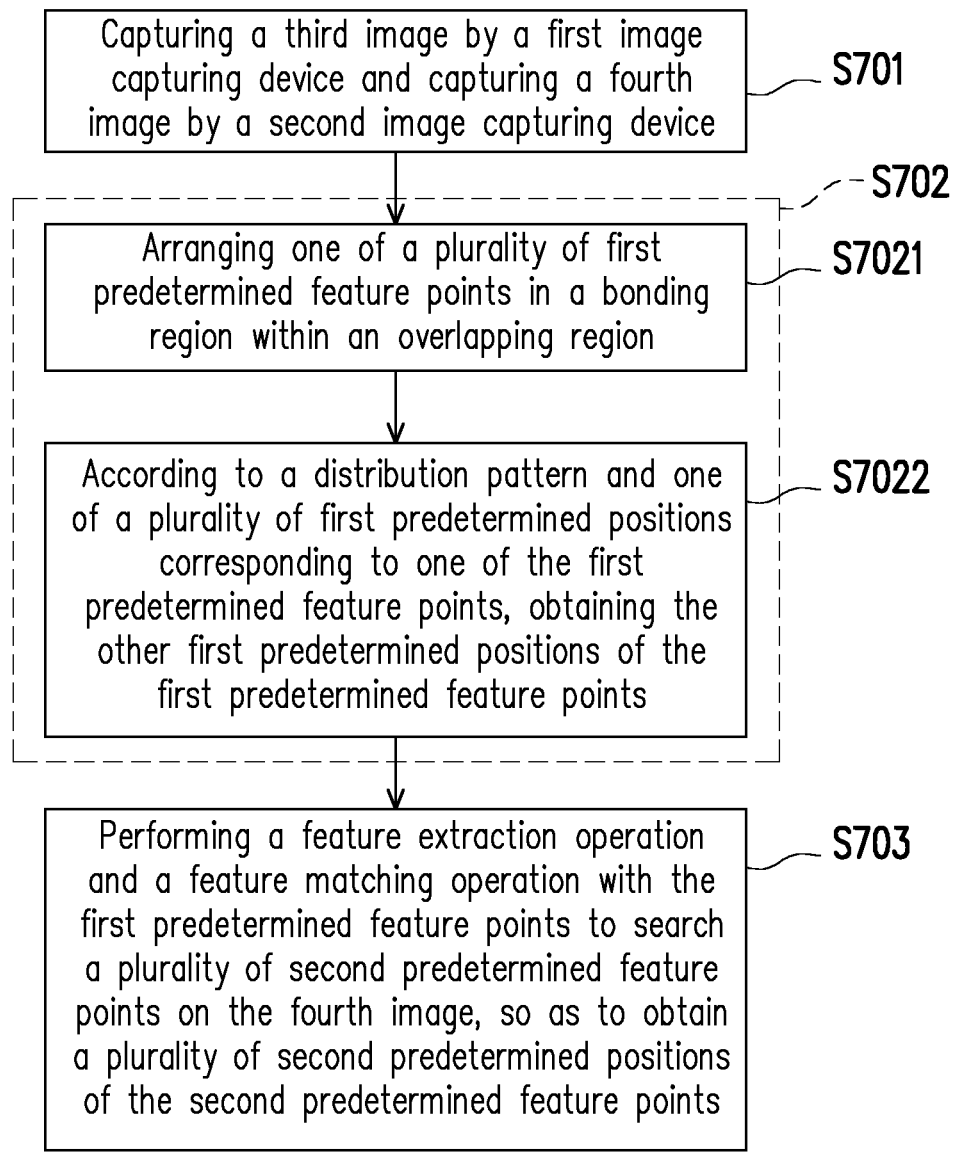
FIG. 7 is a flowchart of a method of obtaining first predetermined positions and second predetermined positions according to an embodiment of the disclosure.

According to the previous embodiment, note that the processor 104 obtains the first feature points and the second feature points configured to determine whether the car lens is already offset according to the pre-stored first predetermined positions and second predetermined positions. Another embodiment is provided below to describe how to obtain the first predetermined positions and the second predetermined positions. FIG. 7 is a flowchart of a method of obtaining the first predetermined positions and the second predetermined positions according to an embodiment of the disclosure. With reference to FIG. 7, the car lens offset detection method provided in the present embodiment is applicable to the car lens offset detection system 100 provided in the previous embodiment, and detailed steps of obtaining the first predetermined positions and second predetermined positions provided in the present embodiment are elaborated with reference to the components of the car lens offset detection system 100. Particularly, before the car lens offset detection system 100 performs the flowchart depicted in FIG. 4 or FIG. 5, the car lens offset detection system 100 may perform the flowchart depicted in FIG. 7 to obtain and accordingly store the first predetermined positions and the second predetermined positions.

In step S701, the processor 104 captures a third image (i.e., the rear view image) by the first image capturing device 101 and captures a fourth image (i.e., the left-side image) by the second image capturing device 102. In step S702, the processor 104 arranges a plurality of first predetermined feature points in an overlapping region between the third image and the fourth image to obtain the first predetermined positions on the third image. It can be learned that the first feature points and the second feature points configured to determine whether the car lens is already offset should correspond to the same environmental content, and therefore the first predetermined positions of the first predetermined feature points are required to be located in the third image and within the overlapping region between the third image and the fourth image. In the present embodiment, step S702 can be divided into sub-steps S7021-S7022.

In sub-step S7021, the processor 104 arranges one of the first predetermined feature points in a bonding region within the overlapping region. The bonding region is, for instance, a bonding line region where the left-side image and the rear view image are bonded while the image stitching function is performed. In sub-step S7022, according to a distribution pattern and one of the first predetermined positions corresponding to one of the first predetermined feature points, the processor 104 obtains the other first predetermined positions of the first predetermined feature points. The distribution pattern is an equilateral triangle with a side length of 60 pixels, for instance; after the first of the first predetermined feature points is arranged, the processor 104 takes the first of the first predetermined feature points as the vertex of the equilateral triangle and searches another two first predetermined feature points, so as to obtain the first predetermined positions of the two first predetermined feature points. However, the distribution pattern is not limited to be an equilateral triangle and can also be in another regular or irregular shape, which can be determined according to actual requirements and needs.

After the first predetermined positions are obtained, in step S703, the processor 104 performs a feature extraction operation and a feature matching operation with the first predetermined feature points to search a plurality of second predetermined feature points on the fourth image, so as to obtain the second predetermined positions of the second predetermined feature points. Particularly, the processor 104 can on the fourth image search and find the second predetermined feature points having the same feature values as those of the first predetermined feature points. It is known that one of the first predetermined feature points is located in the bonding region; therefore, the processor 104 can search the bonding region on the fourth image for the first of the second predetermined feature points. Besides, the distribution pattern of the first predetermined feature points is known; hence, the search scope of other second predetermined feature points can be determined according to the distribution pattern, so as to reduce the amount of calculations and reduce matching errors.

It can be learned that the above embodiment describing how to obtain the first predetermined positions and the second predetermined positions is provided by taking the left-side image captured by the left-side lens and the rear view image captured by the rear-side lens as an example; however, the processor 104 is also able to perform the same steps by taking the right-side image captured by the right-side lens and the rear view image captured by the rear-side lens as an example. As such, the first predetermined positions and the second predetermined positions may be information of pre-stored pixel coordinates stored in the storage circuit 103. Additionally, in another embodiment, the corresponding relationship between each first predetermined position and each second predetermined position can be further stored in the storage circuit 103; thereby, when the processor 104 subsequently performs the flowchart shown in FIG. 4 or FIG. 5, the first feature points and the second feature points can be obtained according to the information of pixel coordinates, and the feature values of the first feature points and the feature values of the corresponding second feature points can be compared according to the stored corresponding relationship.

Detailed explanations of the calibration and warning operation are provided below.

Figure 8:
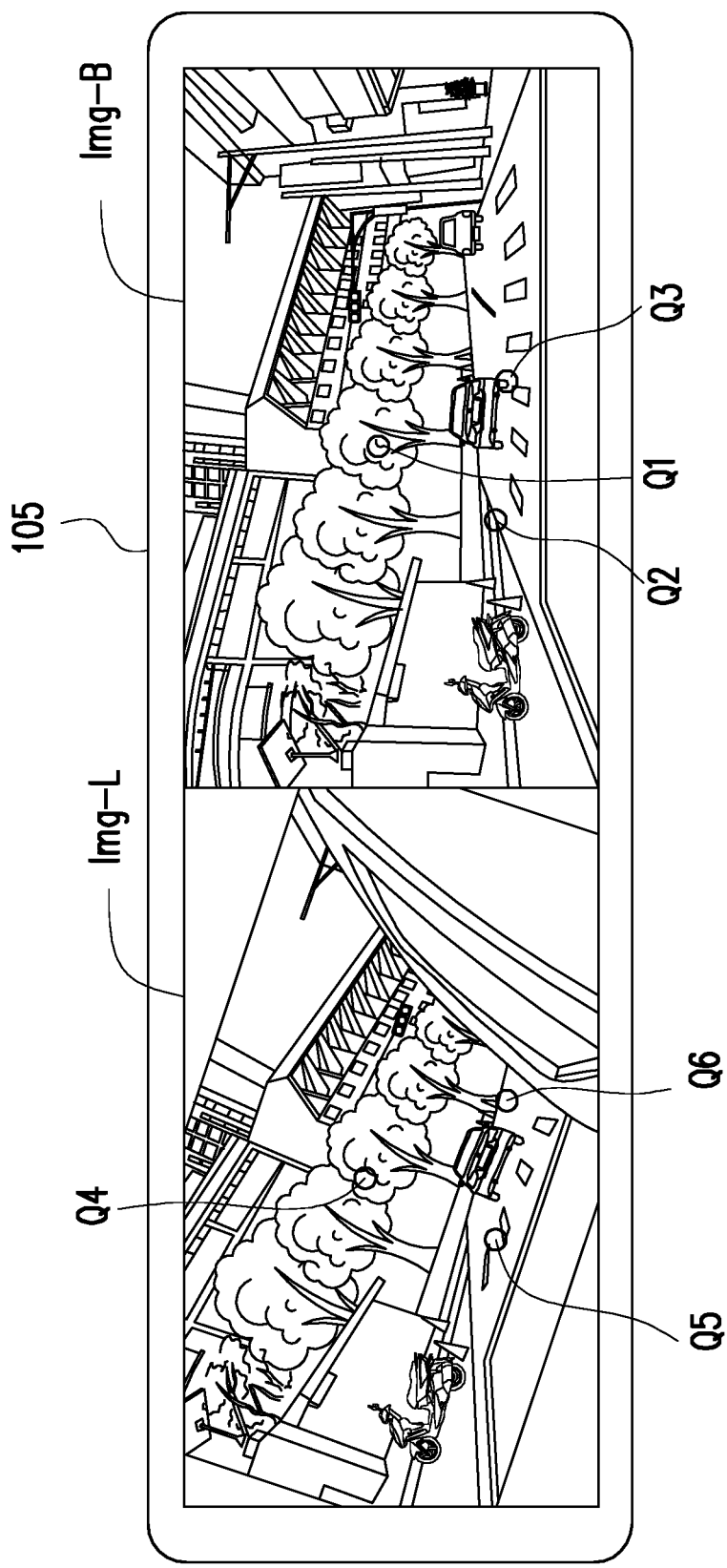
FIG. 8 is a schematic view of a calibrated image according to an embodiment of the disclosure.

In an embodiment, when the processor 104 determines that the first feature points do not match the second feature points, the processor 104 can perform the calibration and warning operation and control the display device 105 to display a calibrated image, so that the driver can manually calibrate the lens direction of the car lens according to the indicative information provided by the calibrated image. More specifically, when the processor 104 determines that the first feature points do not match the second feature points, the processor 104 can control the display device 105 originally displaying the stitched image to be switched to display the calibrated image which simultaneously includes two images respectively captured by the first image capturing device 101 and the second image capturing device 102, and the two images are marked by a plurality of marked points, so as to allow the driver to adjust the lens direction according to the marked points in the calibrated image. FIG. 8 is a schematic view of a calibrated image according to an embodiment of the disclosure. With reference to FIG. 8, according to the pre-stored first predetermined positions and second predetermined positions, the processor 104 can mark a plurality of first marked points Q1-Q3 at the first predetermined positions on the first image Img-B and mark a plurality of second marked points Q4-Q6 at the second predetermined positions on the second image Img-L. Next, the display device 105 simultaneously displays the first image Img-B including the first marked points Q1-Q3 and the second image Img-L including the second marked points Q4-Q6. Thereby, the driver is able to adjust the lens direction of the second image capturing device 102, so that the environmental content corresponding to the second marked points Q4-Q6 is the same as the environmental content corresponding to the first marked points Q1-Q3. As such, the offset condition of the left-side car lens can be rectified.

Figure 9:
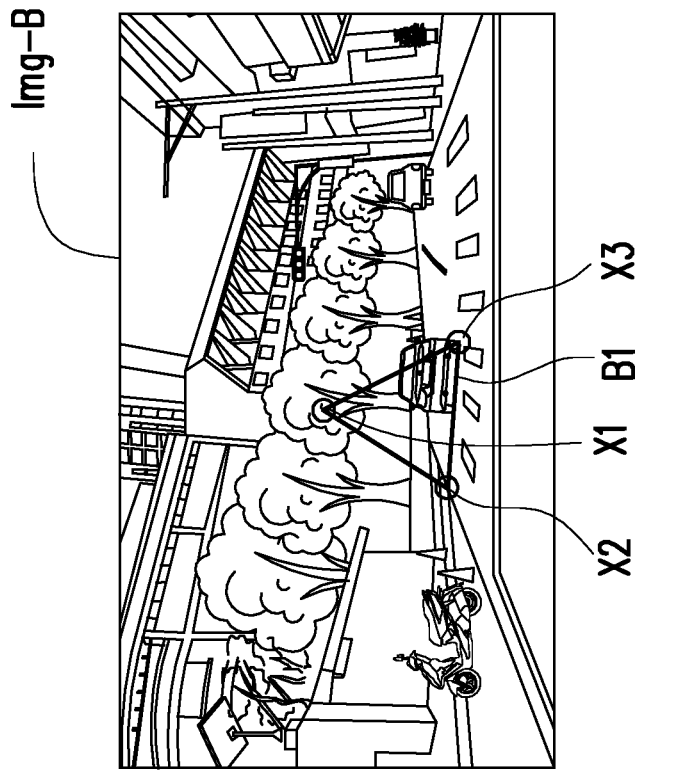
FIG. 9 is a schematic view illustrating a first image and a second image according to an embodiment of the disclosure.
Figure 9:
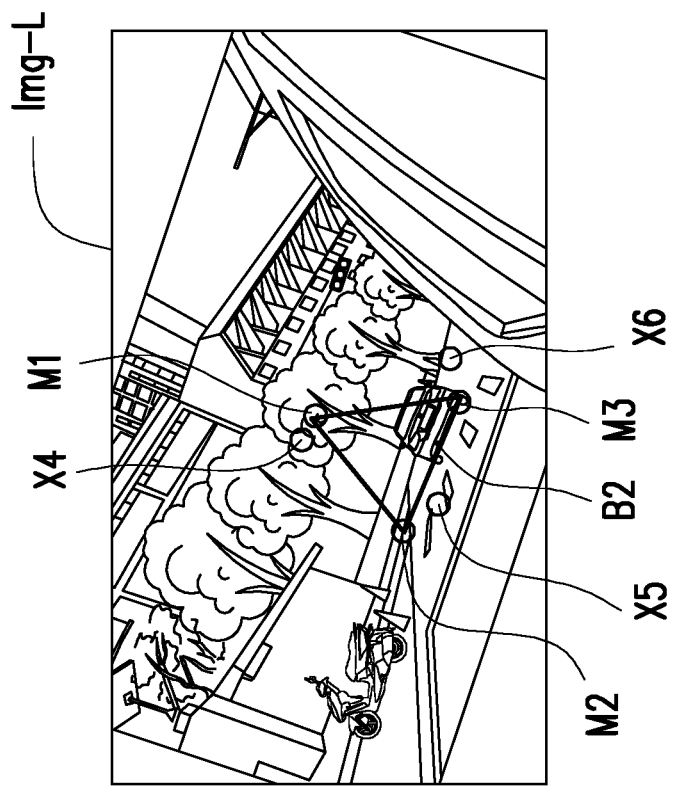

In an embodiment, when the processor 104 determines the first feature points do not match the second feature points, the processor 104 can perform the calibration and warning operation to automatically adjust the lens direction of the car lens. More particularly, when the processor 104 determines that the first feature points do not match the second feature points, the processor 104 can apply an image analyzing technology to determine the offset condition of the car lens and accordingly control an electric motor to automatically adjust the lens direction. FIG. 9 is a schematic view illustrating a first image and a second image according to an embodiment of the disclosure. With reference to FIG. 9, the processor 104 can obtain first image content of a first image block B1 defined by first predetermined positions X1-X3. The processor 104 can on the second image Img-L search a second image block B2 having second image content similar to the first image content, so as to obtain calibration points M1-M3 defining the second image block B2. According to the offset amount between the calibration points M1-M3 and the second predetermined positions X4-X6, the processor 104 can control the electric motor to adjust the lens direction of the second image capturing device 102. The offset amount may include a horizontal offset amount, a perpendicular offset amount, and a rotation offset amount.

In an embodiment, when the processor 104 determines the first feature points do not match the second feature points, the processor 104 can perform the calibration and warning operation and adjust a setting parameter of the image stitching function. Particularly, when the processor 104 determines that the first feature points do not match the second feature points, processor 104 can apply an image analyzing technology to determine the offset condition of the car lens, and accordingly adjust the setting parameter of the image stitching function. As depicted in FIG. 9 in a similar manner, the processor 104 can obtain the offset amount between the positions of the calibration points M1-M3 and the second predetermined positions X4-X6. The processor 104 can then adjust the setting parameter of the image stitching function according to the offset amount, and the setting parameter can be configured to capture a portion of the second image to perform the image stitching function. In particular, the processor 104 normally performs the image stitching function with use of partial content of the actually captured first and second images. Namely, according to the specific setting parameter, the processor 104 captures a portion of the second image content to perform the image stitching function. Hence, after the processor 104 calculates the offset amount, the processor 104 can adjust the position where the second image content is captured, so as to rectify the negative impact of the offset lens direction without adjusting the lens direction. For instance, it is assumed that the size of the second image is 1280*720, and the processor 104 originally performs the image stitching function on a portion of image with the size of 640*370 captured at the pixel location (110,110) from the second image. After the setting parameter of the image stitching function is adjusted according to the offset amount, the processor 104 can, for instance, perform the image stitching function on a portion of image with the size of 640*370 captured at the pixel location (90,110) from the second image.

To sum up, in one or more embodiments provided in the disclosure, whether the car lens is offset can be instantly detected in no need of doing a significant amount of calculations, so as to improve driving safety. When the car lens is already offset, in one or more embodiments provided in the disclosure, the driver can be warned to adjust the lens direction of the car lens according to the calibrated image. Additionally, if the car lens is already offset, in one or more embodiments provided in the disclosure, the lens direction of the car lens can be automatically adjusted or the setting parameter of the image stitching function can be adjusted according to the captured image content. As such, in one or more embodiments provided in the disclosure, the electric rear view mirror can be prevented from displaying distorted or deformed stitched images.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A car lens offset detection method, wherein a first image capturing device and a second image capturing device are disposed on a car, and the method comprises:
   capturing a first image by the first image capturing device and capturing a second image by the second image capturing device;
   obtaining a plurality of first feature points from the first image according to a plurality of first predetermined positions and obtaining a plurality of second feature points from the second image according to a plurality of second predetermined positions, wherein the first predetermined positions and the second predetermined positions comprise information of a plurality of pre-stored pixel coordinates;
   comparing feature values of the plurality of first feature points and feature values of the plurality of second feature points and determining whether the plurality of first feature points match the plurality of second feature points;
   determining whether a car lens of the first image capturing device or a car lens of the second image capturing device is offset by determining whether the plurality of first feature points match the plurality of second feature points; and
   in response to the plurality of first feature points not matching the plurality of second feature points, performing a calibration and warning operation,
   wherein the step of performing the calibration and warning operation comprises:
   obtaining first image content of a first image block defined by the plurality of first predetermined positions;
   searching on the second image a second image block having second image content similar to the first image content to obtain a plurality of calibration points defining the second image block; and
   adjusting a lens direction of the second image capturing device or adjusting a setting parameter of an image stitching function according to an offset amount between the positions of the plurality of calibration points and the plurality of second predetermined positions, wherein the setting parameter is configured to capture a portion of the second image to perform the image stitching function,
   wherein a display device is disposed in the car, and the method further comprises:
   performing the image stitching function on the first image and the second image to generate a stitched image; and
   displaying the stitched image by the display device.

2. The car lens offset detection method according to claim 1, wherein the step of performing the calibration and warning operation in response to the plurality of first feature points not matching the plurality of second feature points comprises:
   determining whether a non-matching number of times is greater than a threshold value;
   in response to that the non-matching number of times is less than or equal to the threshold value, accumulating the non-matching number of times; and
   in response to that the non-matching number of times is greater than the threshold value, performing the calibration and warning operation.

3. The car lens offset detection method according to claim 2, further comprising:
   in response to that the plurality of first feature points match the plurality of second feature points, reducing the non-matching number of times.

4. The car lens offset detection method according to claim 1, wherein an electric rear view mirror including a display device is disposed in the car, and the step of performing the calibration and warning operation comprises:
   turning off a backlight module of the display device.

5. The car lens offset detection method according to claim 1, wherein a display device is disposed in the car, and the step of performing the calibration and warning operation comprises:
   marking a plurality of first marked points at the plurality of first predetermined positions on the first image and marking a plurality of second marked points at the plurality of second predetermined positions on the second image; and
   simultaneously displaying the first image comprising the plurality of first marked points and displaying the second image comprising the plurality of second marked points by the display device.

6. The car lens offset detection method according to claim 1, further comprising:
   capturing a third image by the first image capturing device and capturing a fourth image by the second image capturing device;
   arranging a plurality of first predetermined feature points in an overlapping region between the third image and the fourth image to obtain the plurality of first predetermined positions on the third image; and
   performing a feature extraction operation and a feature matching operation with the plurality of first predetermined feature points to search a plurality of second predetermined feature points on the fourth image, so as to obtain the plurality of second predetermined positions of the plurality of second predetermined feature points.

7. The car lens offset detection method according to claim 6, wherein the step of arranging the plurality of first predetermined feature points in the overlapping region between the third image and the fourth image to obtain the plurality of first predetermined positions on the third image comprises:
   arranging one of the plurality of first predetermined feature points in a bonding region within the overlapping region; and
   according to a distribution pattern and one of the plurality of first predetermined positions corresponding to the one of the plurality of first predetermined feature points, obtaining the other first predetermined positions.

8. A car lens offset detection system disposed on a car and comprising:
   a first image capturing device;
   a second image capturing device;
   a storage circuit storing a plurality of modules; and
   a processor coupled to the storage circuit, the first image capturing device, and the second image capturing device and accessing the plurality of modules to perform following steps:
   capturing a first image by the first image capturing device and capturing a second image by the second image capturing device;
   obtaining a plurality of first feature points from the first image according to a plurality of first predetermined positions and obtaining a plurality of second feature points from the second image according to a plurality of second predetermined positions, wherein the first predetermined positions and the second predetermined positions comprise information of a plurality of pre-stored pixel coordinates;

comparing feature values of the plurality of first feature points and feature values of the plurality of second feature points and determining whether the plurality of first feature points match the plurality of second feature points;

determining whether a car lens of the first image capturing device or a car lens of the second image capturing device is offset by determining whether the plurality of first feature points match the plurality of second feature points; and in response to the plurality of first feature points not matching the plurality of second feature points, performing a calibration and warning operation, wherein the calibration and warning operation comprises adjusting a lens direction of the second image capturing device or adjusting a setting parameter of an image stitching function, wherein the setting parameter is configured to capture a portion of the second image to perform the image stitching function, and the processor is further configured to:

obtain first image content of a first image block defined by the plurality of first predetermined positions;

search on the second image a second image block having second image content similar to the first image content to obtain a plurality of calibration points defining the second image block; and adjust the lens direction of the second image capturing device or adjust the setting parameter of the image stitching function according to an offset amount between the positions of the plurality of calibration points and the plurality of second predetermined positions, wherein the car lens offset detection system further comprises a display device, the processor being further configured to:

perform the image stitching function on the first image and the second image to generate a stitched image, wherein the display device displays the stitched image.

9. The car lens offset detection system according to claim 8, wherein the processor is further configured to:

determine whether a non-matching number of times is greater than a threshold value in response to that the plurality of first feature points do not match the plurality of second feature points;

in response to that the non-matching number of times is less than or equal to the threshold value, accumulate the non-matching number of times; and in response to that the non-matching number of times is greater than the threshold value, perform the calibration and warning operation.

10. The car lens offset detection system according to claim 9, wherein the processor is further configured to:

in response to that the plurality of first feature points match the plurality of second feature points, reduce the non-matching number of times.

11. The car lens offset detection system according to claim 8, further comprising an electric rear view mirror disposed in the car, the electric rear view mirror comprising a display device, the processor being further configured to:

in response to the plurality of first feature points not matching the plurality of second feature points, turn off a backlight module of the display device.

12. The car lens offset detection system according to claim 8, further comprising a display device, the processor being further configured to:

mark a plurality of first marked points at the plurality of first predetermined positions on the first image and mark a plurality of second marked points at the plurality of second predetermined positions on the second image; and simultaneously display the first image comprising the plurality of first marked points and display the second image comprising the plurality of second marked points by the display device.

13. The car lens offset, detection system according to claim 8, wherein the processor is further configured to:

capture a third image by the first image capturing device and capture a fourth image by the second image capturing device;

arrange a plurality of first predetermined feature points in an overlapping region between the third image and the fourth image to obtain the plurality of first predetermined positions on the third image; and perform a feature extraction operation and a feature matching operation with the plurality of first predetermined feature points to search a plurality of second predetermined feature points on the fourth image, so as to obtain the plurality of second predetermined positions of the plurality of second predetermined feature points.

14. The car lens offset detection system according to claim 13, wherein the processor is further configured to:

arrange one of the plurality of first predetermined feature points in a bonding region within the overlapping region; and according to a distribution pattern and one of the plurality of first predetermined positions corresponding to the one of the plurality of first predetermined feature points, obtain the other first predetermined positions.

* * * * *